US006997661B2

(12) United States Patent
Gacos, II

(10) Patent No.: US 6,997,661 B2
(45) Date of Patent: Feb. 14, 2006

(54) ATTACHMENT FOR DECORATIVE OBJECTS FOR VEHICLES

(76) Inventor: John C. Gacos, II, 218 Boston Blvd., Sea Girt, NJ (US) 08750

( * ) Notice: Subject to any disclaimer, the term of this patent is extended or adjusted under 35 U.S.C. 154(b) by 0 days.

(21) Appl. No.: 10/392,596

(22) Filed: Mar. 20, 2003

(65) Prior Publication Data

US 2004/0185191 A1 Sep. 23, 2004

(51) Int. Cl.
*F16B 35/06* (2006.01)

(52) U.S. Cl. ....................... 411/408; 411/409; 411/508; 428/98; 428/542.2; 40/668; 40/607.13

(58) Field of Classification Search ............. 428/542.2, 428/99, 98; 411/408, 409, 410, 413, 501, 411/502, 510, 508, 509, 907, 84; 24/297, 24/293, 285; 248/222.11, 222.13, 316.8; 40/200, 210, 668, 607.13

See application file for complete search history.

(56) References Cited

U.S. PATENT DOCUMENTS 3,069,962 A * 12/1962 Rapata ....................... 411/510
4,342,438 A * 8/1982 Speedie ....................... 248/73
5,857,244 A 1/1999 Edwards et al. .............. 24/297
5,967,725 A 10/1999 Voges ......................... 411/386
5,984,754 A * 11/1999 Freelander ................... 446/73

* cited by examiner

*Primary Examiner*—Deborah Jones
*Assistant Examiner*—Abraham Bahta
(74) *Attorney, Agent, or Firm*—Ernest D. Buff & Associates, LLC; Ernest D. Buff; Theodore J. Pierson

(57) ABSTRACT

An attachment means allows for easy attachment of a decorative item or attachment to a vehicle. The attachment means includes a mounting member comprising a flexible strip, which supports the decorative attachment. A plug is attached to each end of the mounting member. The plug may be easily inserted into and removed from the bottom holes of a license plate on a vehicle. The plugs are attached to the mounting member by extensions, and include slits.

11 Claims, 1 Drawing Sheet

30
28
28
26
26
10
14
24
34
12
32
16

FIG. 1
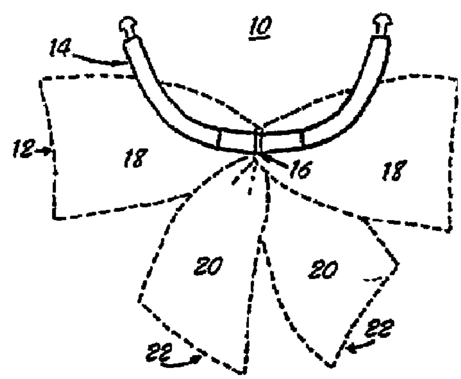
FIG. 2
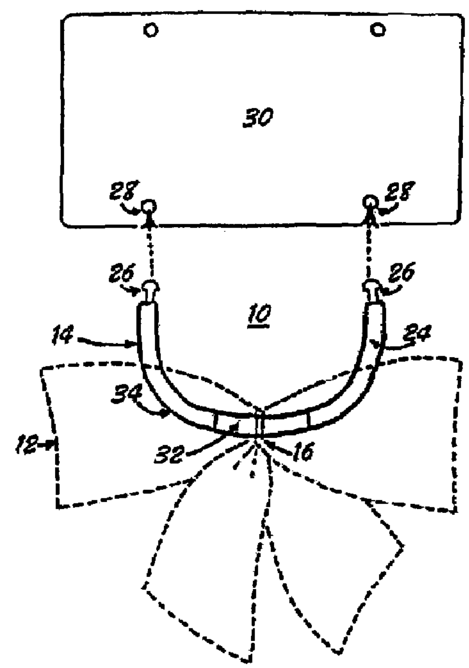
FIG. 3
36
26
38
FIG. 4
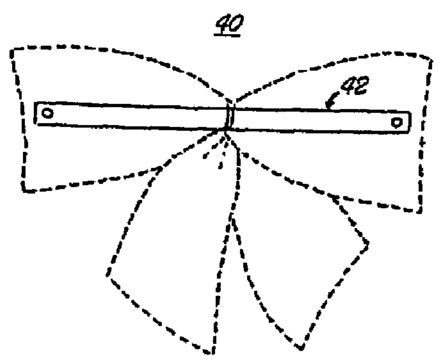
FIG. 5
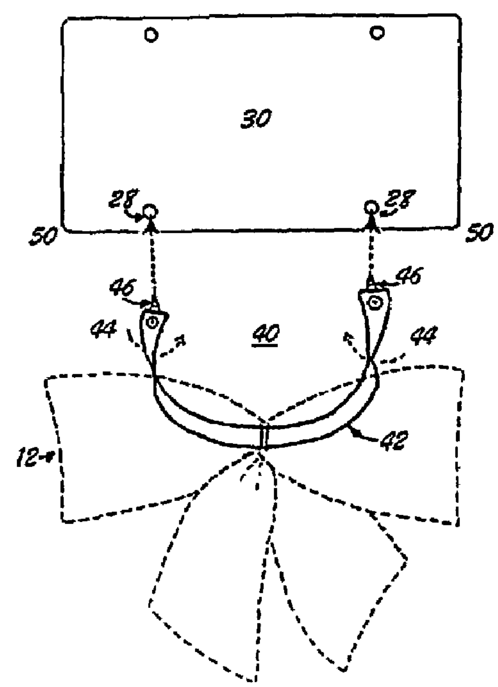
FIG. 6
48
46

ATTACHMENT FOR DECORATIVE OBJECTS FOR VEHICLES

BACKGROUND OF THE INVENTION

1. Field of the Invention

The present invention is directed to a decorative attachment for vehicles; and more particularly to a system for attaching decorative or other items to the license plates of vehicles.

2. Description of the Prior Art

For many years, people have searched and struggled for ways to decorate their automobiles; particularly for special events such as weddings, Easter and the Christmas holiday season. Wreaths have been tied to front grills, and bows and garlands to antennas and roof racks. These decorations must be carefully attached to prevent damage to vehicle parts. Installation is time consuming, and oftentimes imperfect. The decorations tend to become separated and are lost or destroyed during movement of the vehicle at velocities required on interstate highways.

SUMMARY OF THE INVENTION

The present invention provides an attachment means for quickly and securely associating a decorative item or attachment with a vehicle. The attachment means includes a mounting member comprising a flexible strip, which supports the decorative item or attachment. A plug is attached to each end of the mounting member, and may be easily inserted into and removed from the bottom holes of a license plate on a vehicle. Preferably the plugs are attached to the mounting member by extensions, and include slits.

A mounting bracket allows the device to be easily attached to automobiles and other road vehicles. The attachment is accomplished quickly and secures a decorative item to the vehicle in a unique and ideal manner. A one piece special mounting bracket simply plugs into the bottom two holes of the back of the license plate, positioning the bow below the licensed plate in order not to obstruct any of the license plate numbers or letters. In addition, the plastic special mounting bracket, also pushes the decoration back against the automobile, usually in front of the back bumper, away from the wind, allowing the bow's tails to hang below. Once attached, the bow remains securely associated with the vehicle; and will not become separated, damaged or lost during movement of the vehicle at velocities required on interstate highways. Other motorists on the road, seeing this from behind, are amazed at how the bow is so well positioned.

BRIEF DESCRIPTION OF THE DRAWINGS

The invention will be more fully understood and further advantages will become apparent when reference is had to the following detailed description and the accompanying drawings, in which:

FIG. 1 is a back pictorial view of a decorative bow according to an embodiment of the present invention, with the mounting bracket;

FIG. 2 is a front pictorial view of a decorative bow according to an embodiment of the present invention, shown being mounted to the license plate of the vehicle;

FIG. 3 is a side elevated view of the built-in plug end according to an embodiment of the present invention, which is located on the sides of each end of the mounting bracket;

FIG. 4 is a back pictorial view of a decorative bow, with a mounting bracket;

FIG. 5 is a front pictorial view of a decorative bow, showing being mounted to the license plate of the vehicle; and FIG. 6 is a side elevated view of a plug for a decorative bow.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details. Furthermore, well-known features are omitted or simplified in order not to obscure the present invention.

Referring to the FIG. 1 of the drawings, there is shown an exemplary embodiment of the invention 10 comprising three separate components; the bow 12, the mounting bracket 14, and the plastic clip 16.

FIG. 1 is a back pictorial view of a decorative bow according to an embodiment of the present invention, with the mounting bracket. Referring more particularly to FIG. 1, preferably the bow 12 is made of five-inch wide, three-mil outdoor vinyl, in holiday colors, predominantly red. The classic bow 12 design consists of two loops 18 and two tails 20. Together, the two loops 18 across measure approximately twelve inches in total, or about the width of a license plate. Each of the two tails 20, which are cut at angles 22, measure approximately twelve inches long. In alternate embodiments other structures may be attached to the mounting member, for example, the mounting member may be used to support a cutout silhouette design, or a small stuffed animal. Furthermore, the mounting member may be of a different structure than the bracket shown; for example, a flexible rope or a solid rod.

FIG. 2 is a front pictorial view of a decorative bow according to an embodiment of the present invention, shown being mounted to the license plate of the vehicle. Referring to FIG. 2, the one-piece mounting bracket 14, is key to allowing the decorative bow invention 10 to be easily attached, without error, to the vehicle. The mounting bracket 14 is made of flexible, preferably white plastic 24, curved by design 34, with two built-in plugs 26 at each end, for insertion into the bottom two holes 28 of the back license plate 30 of the vehicle. The mounting bracket 14 has a center flat bridge 32, designed to allow the bow 12 to be properly positioned outwardly for display. The curved design 34 of the mounting bracket 14, also positions the bow 12 below the license plate 30, allowing clear visibility of the license plate numbers and letters. The flexible plastic 24 and the curved design 34 of the mounting bracket 14, is also designed to push the bow 12 back and flat against the vehicle, for proper display and protection from the wind. The mounting bracket 14 is attached to the bow 12 by a plastic clip 16.

Referring more particularly to FIG. 2 of the drawings, the decorative bow 10 is attached to the vehicle by inserting the two plugs 26 at each end of the mounting bracket 14, into the bottom two holes 28 of the back license plate 30 of the vehicle.

As shown in FIG. 2, the mounting bracket 14, according to an embodiment of the present invention, has built-in plug ends 26, which preferably cannot be separated from the bracket 14 itself. The built-in plug ends 26 are preferably made of relatively soft plastic 24, as opposed to the plugs 46 as shown in FIG. 6.

FIG. 3 is a side elevated view of the built-in plug end according to an embodiment of the present invention, which is located on the sides of each end of the mounting bracket. Referring to FIG. 3, the built-in plug ends 26 are also designed with slit grooves 36, to allow for easy removal by hand, of the mounting bracket 14, as shown in FIG. 2, from the license plate 30; pliers are not required for removal. Preferably, the built-in plug ends 26, also have a plug end stem 38, which allows additional space for attachment to the license plate, when the license plate frames are in place.

While the decorative attachment of the present invention is described with respect to specific embodiments, it should be noted that the present invention may be implemented in different manners and used with different applications.

For example, the mounting bracket may have a construction, as depicted by FIGS. 4–6. Referring to FIG. 4, there is shown the decorative assembly 40 including the mounting bracket 42. The mounting bracket 42 has a substantially straight design and, as shown in FIG. 5, is twisted 180 degrees 44 and bent in a downward position, before the two end plugs 46 are inserted into the bottom two holes 28 of the license plate 30.

Referring again to FIG. 5 of the drawings, the mounting bracket 42 has two plugs 46, which are separate from the bracket. These two plugs must be assembled to the mounting bracket 42 facing inward. Such assembly of the plugs facilitates twist 44 and bending of the mounting bracket 42 properly downward before insertion of the plugs 46 into the license plate 28 during installation of the bracket 42.

Referring to FIG. 6 of the drawings, the plugs 46 are composed of hard plastic 48. Removal of the bracket from the license plate is readily accomplished using pliers, or the like. A tight press-fit is achieved by plugs 46. When pulled out firmly, as shown in FIG. 5, the plugs, the plugs 46 are readily removed without causing bending damage to the corners 50 of the license plate 30.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. An attachment means for a decorative item, comprising:

a. a mounting member having a one-piece mounting bracket, a first end and a second end and supporting the decorative item;

b. a first plug attached to the first end and a second plug attached to the second end, each plug having slits and being adapted for insertion into a first hole and a second hole, respectively, of a license plate, each of said first and second holes and said one-piece mounting bracket having diameters; and c. said diameter of said one-piece mounting bracket being larger than said diameters of said first and second holes.

2. An attachment means as recited by claim 1, wherein said mounting member is a flexible strip.

3. An attachment means as recited by claim 1, wherein each plug comprises:

a. a stem, said stem having a diameter which is smaller than said holes of said license plate; and b. an expanded flexible portion attached to said stem, said expanded flexible portion having a diameter which is larger than said holes of said license plate.

4. An attachment means as recited by claim 3, wherein said plugs are composed of plastic.

5. An attachment means as recited by claim 4, wherein said mounting member is a flexible strip.

6. An attachment means as recited by claim 5, wherein said mounting member holds said decorative item at a position below said license plate.

7. An attachment means as recited by claim 1, wherein said plugs are composed of plastic.

8. An attachment means as recited by claim 1, wherein said mounting member holds said decorative attachment at a position below said license plate.

9. An attachment means for attaching an item to a first hole and a second hole, respectively, in a license plate, comprising:

a. a mounting member having a one-piece mounting bracket, a first end and a second end and supporting said item;

b. a first plug attached to said first end and a second plug attached to said second end, each plug having slits and being capable of being removably inserted into said first hole and said second hole in said license plate without using tools;

wherein each of said first and second holes and said one-piece mounting bracket have diameters; and c. said diameter of said one-piece mounting bracket being larger than said diameters of said first and second holes.

10. An attachment means as recited by claim 9, wherein said mounting member is a flexible strip.

11. An attachment means as recited by claim 8, wherein each plug comprises:

a. a stem, said stem having a diameter which is smaller than said holes of said license plate; and b. an expanded flexible portion attached to said stem, said expanded flexible portion having a diameter which is larger than said holes of said license plate.

* * * * *